(12) United States Patent
Koshizen (10) Patent No.: US 9,031,761 B2
(45) Date of Patent: May 12, 2015

(54) DRIVING ASSIST APPARATUS FOR A VEHICLE

(75) Inventor: Takamasa Koshizen, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 13/993,607

(22) PCT Filed: Dec. 9, 2011

(86) PCT No.: PCT/JP2011/006878
§ 371 (c)(1),
(2), (4) Date: Jun. 12, 2013

(87) PCT Pub. No.: WO2012/081208
PCT Pub. Date: Jun. 21, 2012

(65) Prior Publication Data
US 2013/0268174 A1    Oct. 10, 2013

(30) Foreign Application Priority Data

Dec. 15, 2010 (JP) ................................. 2010-278752

(51) Int. Cl.
*B60W 30/16* (2012.01)
*G08G 1/00* (2006.01)
(Continued)

(52) U.S. Cl.
CPC .................. *G08G 1/00* (2013.01); *B60W 30/17* (2013.01); *B60W 40/10* (2013.01); *B60W 50/082* (2013.01); *B60W 30/16* (2013.01); *G08G 1/16* (2013.01); *B60W 2050/0075* (2013.01); *B60W 2550/308* (2013.01)

(58) Field of Classification Search
CPC .......... B60W 2550/308; B60W 40/01; B60W 30/16; B60W 30/17; G08G 1/00

USPC ............................................. 701/96, 117, 118
See application file for complete search history.

(56) References Cited

U.S. PATENT DOCUMENTS

2004/0010362 A1 * 1/2004 Michi et al. ..................... 701/93
2009/0271084 A1   10/2009 Taguchi

FOREIGN PATENT DOCUMENTS

JP    2004-233191 A    8/2004
JP    2007-219743 A    8/2007
(Continued)

OTHER PUBLICATIONS

International Search Report, mailing date Jan. 17, 2012.

*Primary Examiner* — Thomas Tarcza
*Assistant Examiner* — Kevin Myhre
(74) *Attorney, Agent, or Firm* — Westerman, Hattori, Daniels & Adrian, LLP (57) ABSTRACT

A driving assist apparatus for a vehicle is provided. The apparatus includes a determination unit that determines a state of a traffic flow in a lane in which a ego-vehicle is driving, on the basis of acceleration of the ego-vehicle and inter-vehicle distances to other vehicles around the ego-vehicle. The apparatus also includes a drive control unit that controls a motion of the ego-vehicle and is capable of switching drive control according to a determination result by the determination unit. The drive control unit switches the drive control when the determination result indicates that the state of the traffic flow is a state of a critical region which is present in a transition period from a free-flow state to a mixed-flow state. Here, the free-flow state is a state in which the probability of occurrence of traffic congestion is low, and the mixed-flow state is a state in which a braking state and an acceleration state of a vehicle are mixed.

9 Claims, 9 Drawing Sheets

(51) Int. Cl.
*B60W 30/17* (2012.01)
*B60W 40/10* (2012.01)
*B60W 50/08* (2012.01)
*G08G 1/16* (2006.01)
*B60W 50/00* (2006.01)

(56) References Cited

FOREIGN PATENT DOCUMENTS

JP 2009-262862 A 11/2009
JP 2010-036862 A 2/2010

* cited by examiner

DRIVING ASSIST APPARATUS FOR A VEHICLE

CROSS-REFERENCED TO RELATED APPLICATIONS

This application is a National Stage entry of International Application PCT/JP2011/006878 filed Dec. 9, 2011, which claims priority to Japanese Application No. 2010-278752, filed Dec. 15, 2010, the disclosure of these prior applications are hereby incorporated in their entirety by reference.

FIELD OF THE INVENTION

The present invention relates to a driving assist apparatus for a vehicle, more specifically, to a driving assist apparatus that has a function to determine a state of a traffic flow, based on acceleration of the vehicle and an inter-vehicle distance to other vehicles, and to change drive control of the vehicle according to a result of the determination.

RELATED ART

Conventionally, drive control devices for preventing or avoiding traffic congestion are proposed. For example, Patent Document 1 describes that, acquiring a traffic state including a vehicle density of a road on which a vehicle drives, as the vehicle density approaches to a certain critical density, the vehicle is controlled more strictly for avoiding the inter-vehicle distance to be short, in order to prevent or avoid the traffic flow from changing to a congested flow.

PRIOR ART DOCUMENT

Patent Document

Patent Document 1: JP 2009-262862 A

SUMMARY OF THE INVENTION

Problem to be Solved

However, in the methods described in Patent Document 1, the determination accuracy of the traffic congestion prediction using the vehicle density is not always high, so that there is further room for improvement for avoiding or eliminating the traffic congestion.

An object of the present invention is to provide a driving assist apparatus that can perform effective drive control for avoiding or eliminating the traffic congestion, improving the determination (estimation) accuracy of the traffic flow.

Solution to the Problem

The present invention provides a driving assist apparatus for a vehicle (in this document, the vehicle on which the driving assist apparatus is mounted is referred to as "ego-vehicle"). The apparatus includes a determination unit that determines a state of a traffic flow in a lane in which the ego-vehicle is driving, on the basis of acceleration of the ego-vehicle and inter-vehicle distances to other vehicles around the ego-vehicle. The apparatus also includes a drive control unit that controls a motion of the ego-vehicle and is capable of switching drive control according to a determination result by the determination unit. The drive control unit switches the drive control when the determination result indicates that the state of the traffic flow is a state of a critical region which is present in a transition period from a free-flow state to a mixed-flow state. Here, the free-flow state is a state in which the probability of occurrence of traffic congestion is low, and the mixed-flow state is a state in which a braking state and an acceleration state of a vehicle are mixed.

According to the present invention, the drive control is switched when the traffic flow is determined to be in the state of the critical region which is present in a transition period from the free-flow state to the mixed-flow state, on the basis of the acceleration of the ego-vehicle and the inter-vehicle distances to other vehicles around the ego-vehicle. Therefore, the state of the traffic flow is prevented from developing into the mixed-flow state and consequent traffic congestion.

According to an aspect of the present invention, the driving assist apparatus further includes a notification control unit that controls a notification unit mounted on the ego-vehicle. The notification control unit switches notification content notified by the notification unit according to the switching of the drive control performed by the drive control unit.

According to an aspect of the present invention, a driver is notified of occurrence of the switching of the drive control when the state of the traffic flow is the state of the critical region. Thereby, the driver can recognize that drive control is required to prevent the state of the traffic flow from developing into the mixed-flow state and consequent traffic congestion.

According to an aspect of the present invention, the drive control unit includes an adaptive cruise control function and the switching of the drive control includes turning on or off the adaptive cruise control function.

According to an aspect of the present invention, the adaptive cruise control function is turned on or off when the state of the traffic flow is the state of the critical region. Therefore, the drive control is performed more effectively to prevent the state of the traffic flow from developing into traffic congestion.

According to an aspect of the present invention, the determination unit determines the state of the traffic flow from a correlation map between a logarithm of a maximal gradient value calculated from a simple linear regression line of a power spectrum obtained from an acceleration value of the ego-vehicle and a logarithm of a minimum value of covariance calculated from a distribution of the inter-vehicle distances.

According to an aspect of the present invention, the presence of the critical region in the vehicle group distribution is determined more accurately, using the correlation map between the logarithm of the minimum value of covariance and the logarithm of the maximal gradient value.

DESCRIPTION OF EMBODIMENTS

Figure 1:
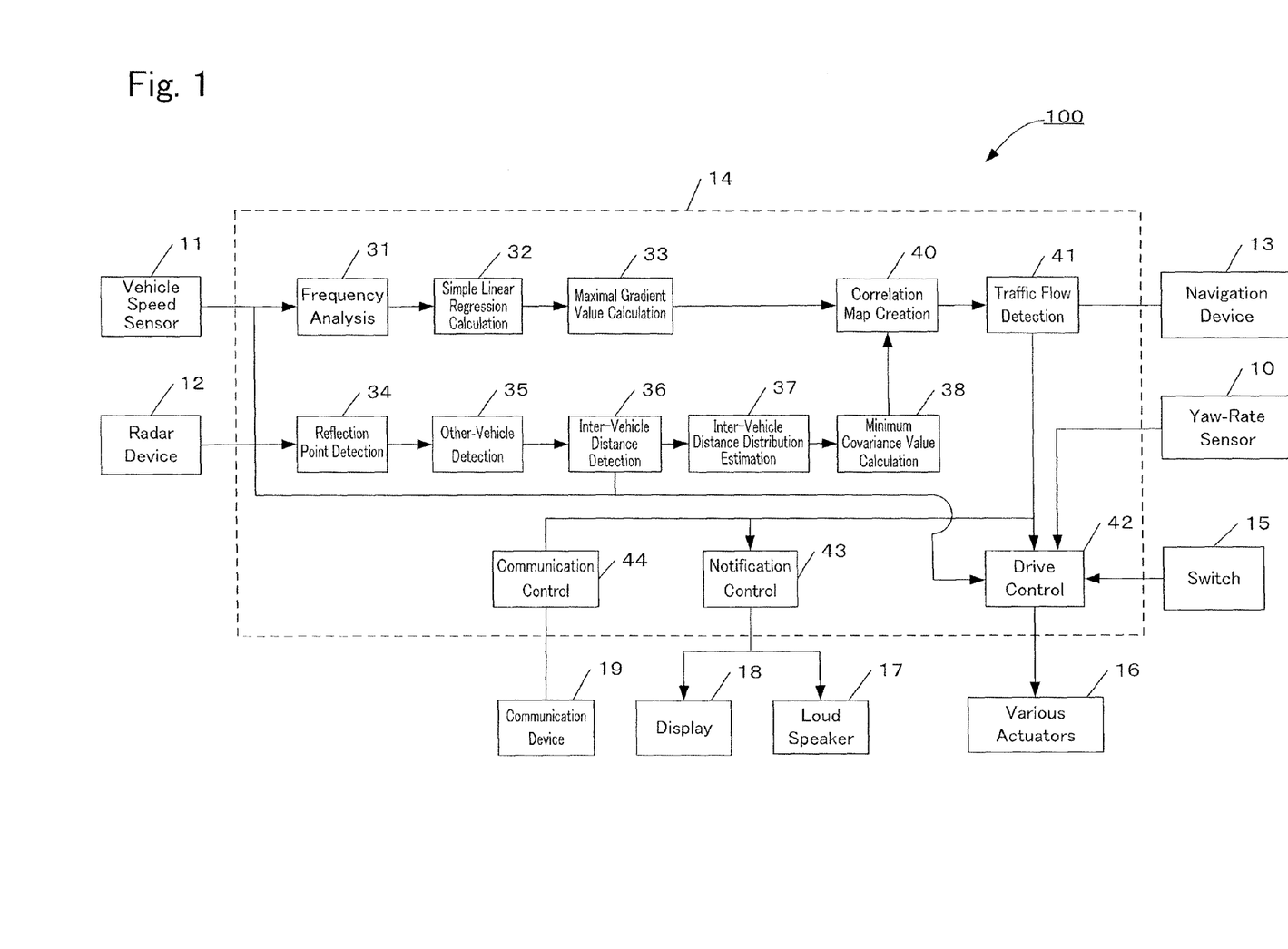
FIG. 1 is a diagram showing a configuration of a driving assist apparatus for a vehicle according to an embodiment of the present invention.

An embodiment of the present invention will be described with reference to the drawings. FIG. 1 is a block diagram showing a configuration of a driving assist apparatus 100 according to an embodiment of the present invention. The apparatus 100 is mounted on a vehicle (in this document, the vehicle on which the driving assist apparatus is mounted on is referred to as "ego-vehicle"). The apparatus 100 may be mounted as one apparatus or a part of another apparatus.

The apparatus 100 includes a yaw-rate sensor 10, a vehicle speed sensor 11, a radar device 12, a navigation device 13, a processing unit 14, a switch 15, various actuators 16, a loud speaker 17, a display 18, and a communication device 19. The processing unit 14 may be integrated in the navigation device 13. As the loud speaker 17 and the display 18, corresponding units in the navigation device 13 may be used.

The yaw-rate sensor 10 detects a yaw rate of the ego-vehicle and transmits the detected signal to the processing unit 14. The vehicle speed sensor 11 detects acceleration of the ego-vehicle and transmits the detected signal to the processing unit 14. The radar device 12 divides a detection target region predetermined around the ego-vehicle into a plurality of angle regions, emits an electromagnetic wave such as an infrared laser light and a millimeter wave, and scans each of the angle region with the electromagnetic wave. The radar device 12 receives a reflection signal (electromagnetic wave) from an object in the detection target region and transmits the reflection signal to the processing unit 14.

The navigation device 13 receives a positioning signal such as a GPS signal and calculates the current position of the ego-vehicle from the positioning signal. Alternatively, the navigation device 13 may calculate the current position of the ego-vehicle with the autonomous navigation method, using the acceleration and the yaw rate detected by the vehicle speed sensor 11 and a yaw rate sensor (not shown). The navigation device 13 has map data and displays a map with indications of the current position of the ego-vehicle, route information to a destination, and traffic congestion information.

The processing unit 14 includes a frequency analysis unit 31, a simple linear regression calculation unit 32, a maximal gradient value calculation unit 33, a reflection point detection unit 34, an other-vehicle detection unit 35, an inter-vehicle distance detection unit 36, an inter-vehicle distance distribution estimation unit 37, a minimum covariance value calculation unit 38, a correlation map creation unit 40, a traffic flow determination unit 41, a drive control unit 42, a notification control unit 43, and a communication control unit 44. The functions of each unit are realized by a computer (CPU) in the processing unit 14. The details of the functions of each unit will be described below.

As a hardware configuration, the processing unit 14 includes, for example, an A/D converter circuit that converts an input analog signal into an digital signal, a central processing unit (CPU) that performs various operations, a RAM used by the CPU to store data when the CPU performs operations, a ROM that stores programs executed by the CPU and data (including tables and maps) used by the CPU, and an output circuit that outputs a drive signal for the loud speaker 17 and a display signal for the display 18.

The switch 15 outputs various signals related to drive control of the ego-vehicle to the processing unit 14. The various signals may include, for example, operation (position) signals of an accelerator pedal and a brake pedal, and signals related to adaptive cruise control (ACC) (such as start control, stop control, target vehicle speed, inter-vehicle distance, and the like).

The various actuators 16 are used as a generic name of a plurality of actuators and include, for example, an acceleration actuator (throttle actuator and the like), a deceleration actuator (brake actuator and the like), a steering actuator, and the like.

The display 18 includes a display panel such as an LCD, and the display panel may have a touch panel function. The display 18 may include a voice output unit and a voice input unit. The display 18 notifies a driver of an alarm by displaying predetermined alarm information or lighting/blinking a predetermined alarm lamp according to a control signal from the notification control unit 43. The loud speaker 17 notifies a driver of an alarm by outputting a predetermined alarm sound or voice according to a control signal from the notification control unit 43.

The communication device 19 communicates with other vehicles, servers (not shown), or a repeater station (not shown) by radio communication, under the control of the communication control unit 44. The communication device 19 transmits a traffic congestion prediction result associated with position information, which are output from the traffic congestion prediction unit 41, and receives from other vehicles the same correspondence information between a traffic congestion prediction result and position information. The acquired information is transferred to the notification control unit 43 or the drive control unit 42 through the communication control unit 44.

Figure 2:
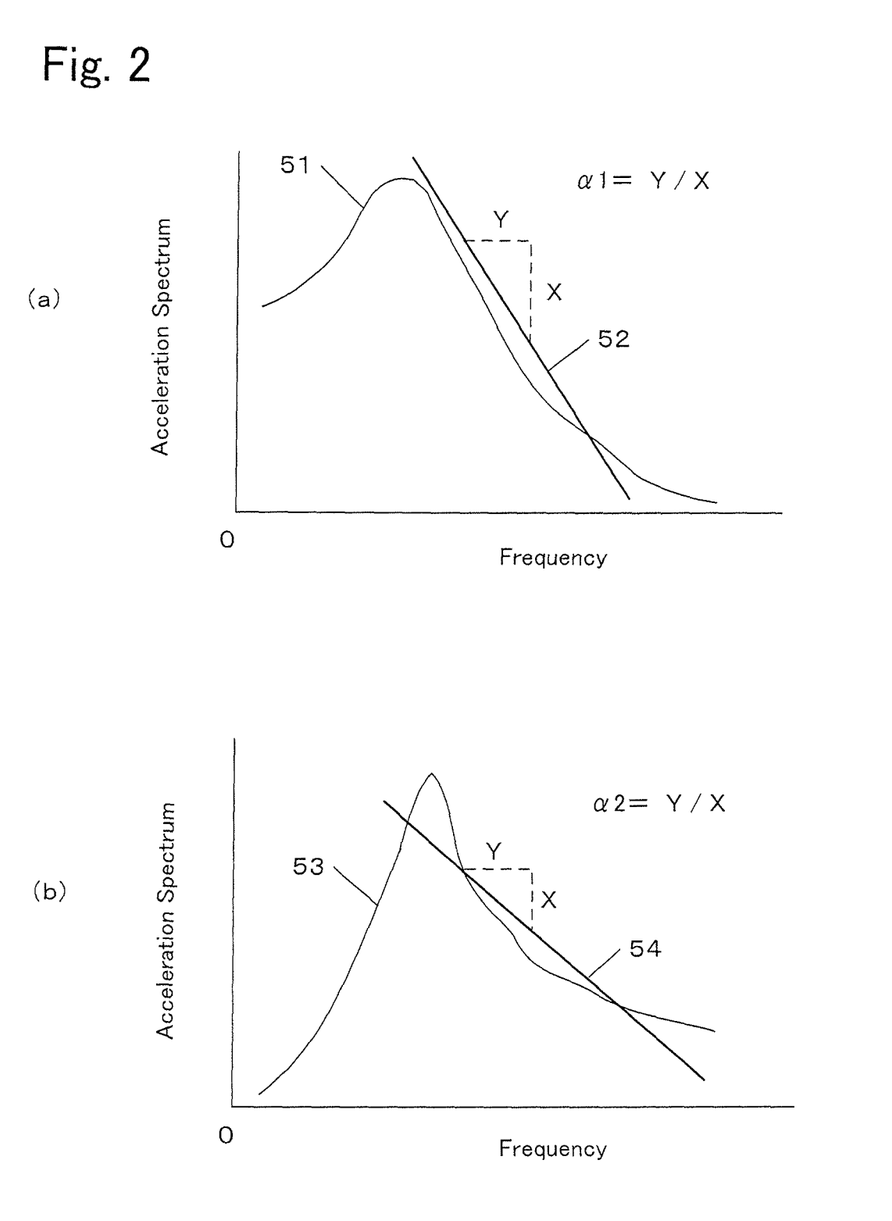
FIG. 2 is a diagram showing an acceleration spectrum according to the embodiment of the present invention.

Next, the functions of each unit in the processing unit 14 are described. The frequency analysis unit 31 performs frequency analysis on the acceleration of the ego-vehicle detected by the vehicle speed sensor 11 and calculates a power spectrum. FIG. 2 shows examples of the power spectrum in two different driving states (a) and (b). In FIG. 2, acceleration spectrums 51 and 53 are illustrated as power spectrums for certain frequency range.

The simple linear regression calculation unit 32 performs a simple linear regression analysis on an obtained power spectrum and calculates a simple linear regression line. In the examples shown in FIG. 2, straight lines denoted by reference numerals 52 and 54 are simple linear regression lines obtained corresponding to the acceleration spectrums 51 and 53 respectively.

The maximal gradient value calculation unit 33 calculates a maximal gradient value from the obtained simple linear regression line. In the examples shown in FIG. 2, first, the maximal gradient value calculation unit 33 calculates the gradients of the simple linear regression lines 52 and 54. Specifically, in FIG. 2, the maximal gradient value calculation unit 33 calculates gradients α(=Y/X) based on a change X of the spectrum value in a predetermined frequency range Y (for example, a frequency range of 0 to 0.5 Hz which corresponds to a time range from several seconds to several minutes). In FIG. 2, α1 and α2 which are gradients in (a) and (b) are obtained.

Next, a difference between the obtained gradients α, that is, a difference $\Delta\alpha(=\alpha_k-\alpha_{k-1})$ between the gradients $\alpha_k$ and $\alpha_{k-1}$ obtained at a predetermined time interval, is calculated. A maximal value of temporal change of the obtained difference Δα or temporal change of a parameter obtained from the difference Δα (for example, a square value $(\Delta\alpha)^2$ or an absolute value $|\Delta\alpha|$) is obtained. The obtained maximal value is stored in a memory (RAM or the like) in the processing unit 14 as a maximal gradient value.

The reflection point detection unit 34 detects a position of a reflection point (object) from the reflection signal detected by the radar device 12. The other-vehicle detection unit 35 detects at least one other vehicle around the ego-vehicle, on the basis of a distance between adjacent reflection points and a distribution of the reflection points, calculated from position information of the reflection points output from the reflection point detection unit 34. The inter-vehicle distance detection unit 36 detects inter-vehicle distances between the ego-vehicle and other vehicles, based on information about other vehicles detected by the reflection point detection unit 34, and outputs the result together with the number of the detected other vehicles.

Figure 3:
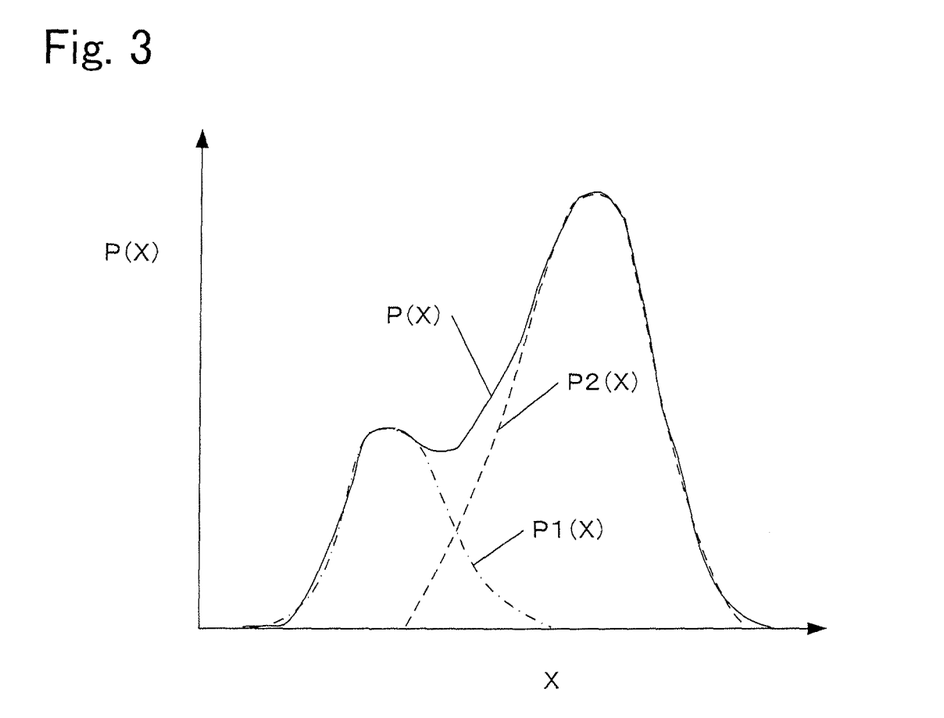
FIG. 3 is a diagram showing a probability density distribution according to the embodiment of the present invention.

The inter-vehicle distance distribution estimation unit 37 estimates an inter-vehicle distance distribution from the information of the inter-vehicle distances and the number of vehicles provided from the inter-vehicle distance detection unit 36. Next, the inter-vehicle distance distribution estimation will be described with reference to FIGS. 3 and 4. FIG. 3 is a diagram showing a probability density distribution.

When vehicle groups, that is, aggregations of vehicles which have relatively close values of inter-vehicle distances, are observed in front of the ego-vehicle, from the information of the inter-vehicle distances and the number of vehicles, Gaussian distribution (probability density distribution) is applied to each vehicle group by using a distribution estimation method such as variational Bayes. For example, if there are two vehicle groups, these groups can be described as a distribution obtained by linearly combining two Gaussian distributions.

Specifically, as shown in FIG. 3, a probability function P(X) that represents the entire distribution can be obtained as a sum (superposition) of probability functions P1(X) and P2(X) that represent the two Gaussian distributions.

When the Gaussian distribution (probability function) is represented by N(X|μ, Σ), the superposition of a plurality of Gaussian distributions as illustrated in FIG. 3 can be obtained by the following formula:

$$p(x) = \sum_{k=1}^{K} \pi_k N(x \mid \mu_k, \Sigma_k)$$ [Formula 1]

Here, $\mu_k$ is an expected value (average value) and represents a position at which the density is the highest. $\Sigma_k$ is a covariance value (matrix) and represents a distortion of the distribution, that is, how the density decreases as going away from the expected value in what direction. $\pi_k$ is a mixing coefficient (mixing ratio) of Gaussian distribution and represents a ratio ($0 \leq \pi_k \leq 1$) indicating how much each Gaussian distribution contributes. The mixing coefficient $\pi_k$ can be considered as a probability.

Figure 4:
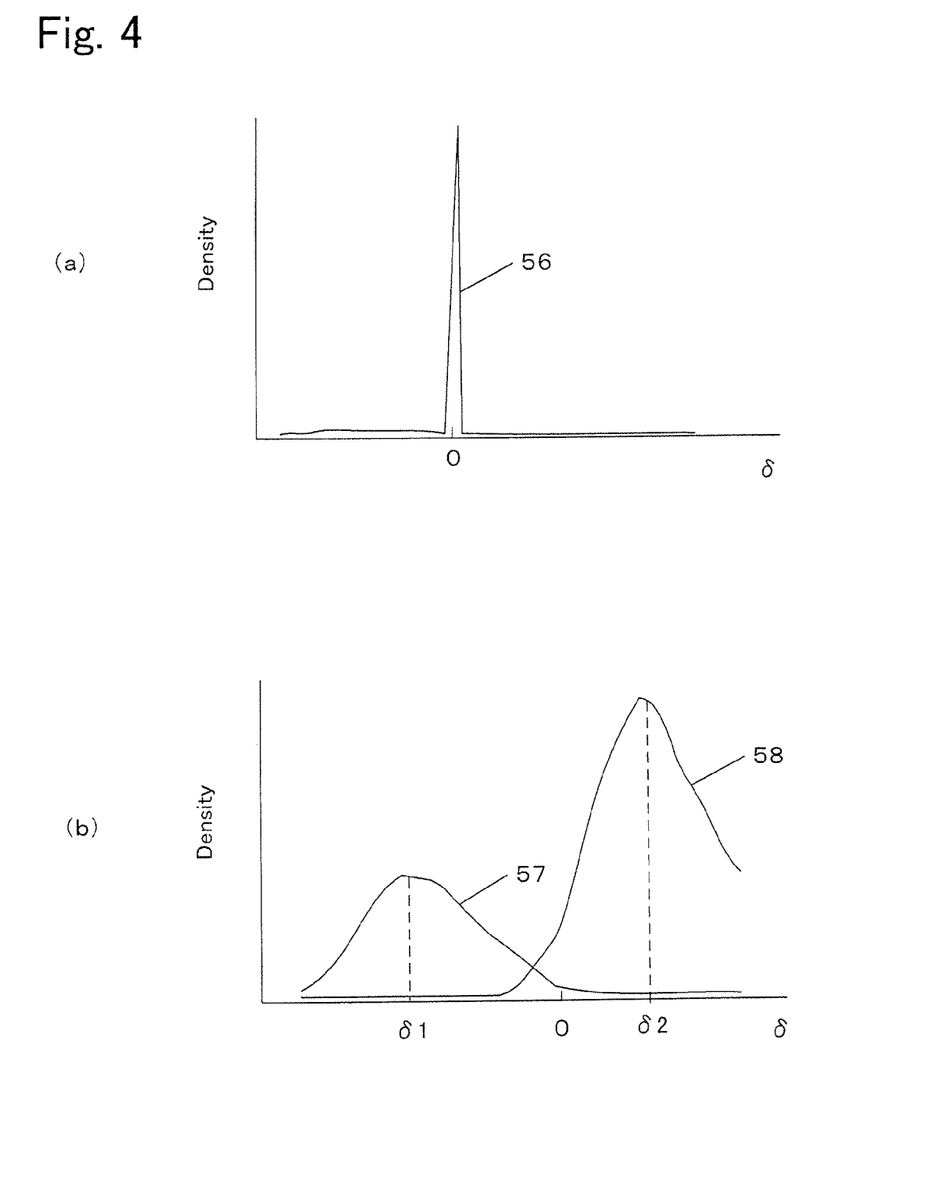
FIG. 4 is a diagram schematically showing a covariance value $\Sigma_k$ according to the embodiment of the present invention.

With respect to the obtained Gaussian distribution P(X), the minimum covariance value calculation unit 38 calculates a corresponding covariance value $\Sigma_k$ by using, for example, a maximum likelihood method. For this calculation, for example, the minimum covariance value calculation unit 38 uses the EM algorithm to obtain a parameter (covariance) at which a likelihood function calculated from the P(X) is the maximum. When the Gaussian distribution P(X) is obtained as a superposition of a plurality of Gaussian distributions as illustrated in FIG. 4, the covariance value $\Sigma_k$ is calculated for each Gaussian distribution.

The minimum covariance value calculation unit 38 calculates a minimum value of covariance values $\Sigma_k$ obtained for each Gaussian distribution P(X). FIG. 4 is a diagram schematically showing the covariance value $\Sigma_k$. In FIG. 4 (a), graph 56 showing the covariance value $\Sigma_k$ has a sharp shape at delta (δ) 0, which indicates that there is no variation in the vehicle group, that is, the vehicles in the group are in a driving state in which the inter-vehicle distances are substantially constant. On the other hand, in FIG. 4 (b), two graphs 57 and 58 are obtained. The graph 57 has a peak at 61 in a region where the delta (δ) is negative and the graph 58 has a peak at 62 in a region where the delta (δ) is positive. Both the graphs 57 and 58 have a certain fluctuation range (δ), which indicates that there are some variations in the vehicle group, that is, there are a plurality of aggregations of vehicles whose inter-vehicle distances are different. In FIG. 4 (a), the minimum value of the covariance value $\Sigma_k$ is substantially zero. In FIG. 4 (b), the minimum value of the covariance value $\Sigma_k$ is δ1 which is the smaller than δ2.

Figure 5:
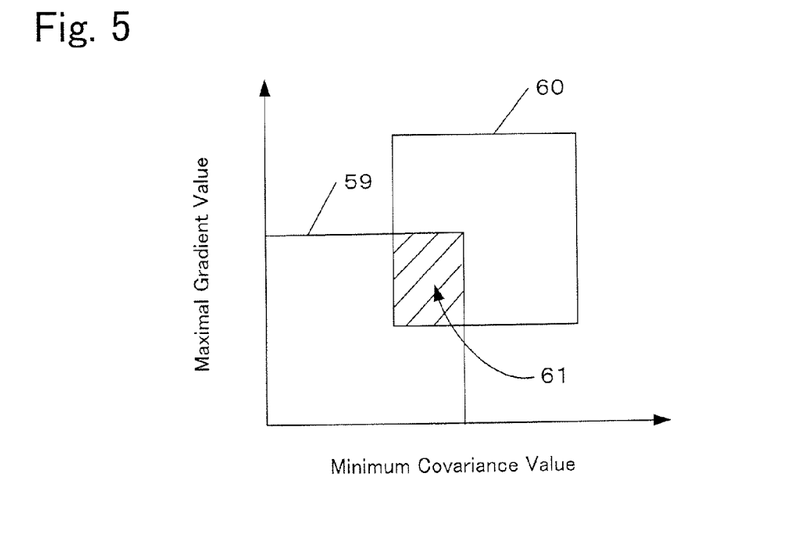
FIG. 5 is an image diagram (conceptual diagram) of a correlation map between a maximal gradient value and a minimum covariance value, according to the embodiment of the present invention.

The correlation map creation unit 40 in FIG. 1 creates a correlation map between the maximal gradient value calculated by the maximal gradient value calculation unit 33 and the minimum covariance value calculated by the minimum covariance value calculation unit 38. FIG. 5 is an image diagram (conceptual diagram) of the correlation map between the maximal gradient value and the minimum covariance value. In FIG. 5, the horizontal (X) axis represents the minimum covariance value X, the vertical (Y) axis represents the maximal gradient value, and the correlation between the variables (X, Y) is mapped. Two regions denoted by reference numerals 59 and 60 are shown and there is a boundary region 61 where the two regions overlap each other. In the region 59, the minimum covariance value is relatively small, which corresponds to a state in which the variation in the vehicle group is small, that is, a state in which the inter-vehicle distances are relatively constant. On the other hand, in the region 60, the minimum covariance value is relatively large, which corresponds to a state in which the variation in the vehicle group is large, that is, a state in which there are a plurality of aggregations of vehicles whose inter-vehicle distances are different. The boundary region 61 is a transition region from the state in which the variation in the vehicle group is small to the state in which the variation in the vehicle group is large. The present invention is characterized in that the traffic congestion prediction is performed by quantitatively detecting the state of the vehicle group corresponding to the boundary region 61.

Figure 6:
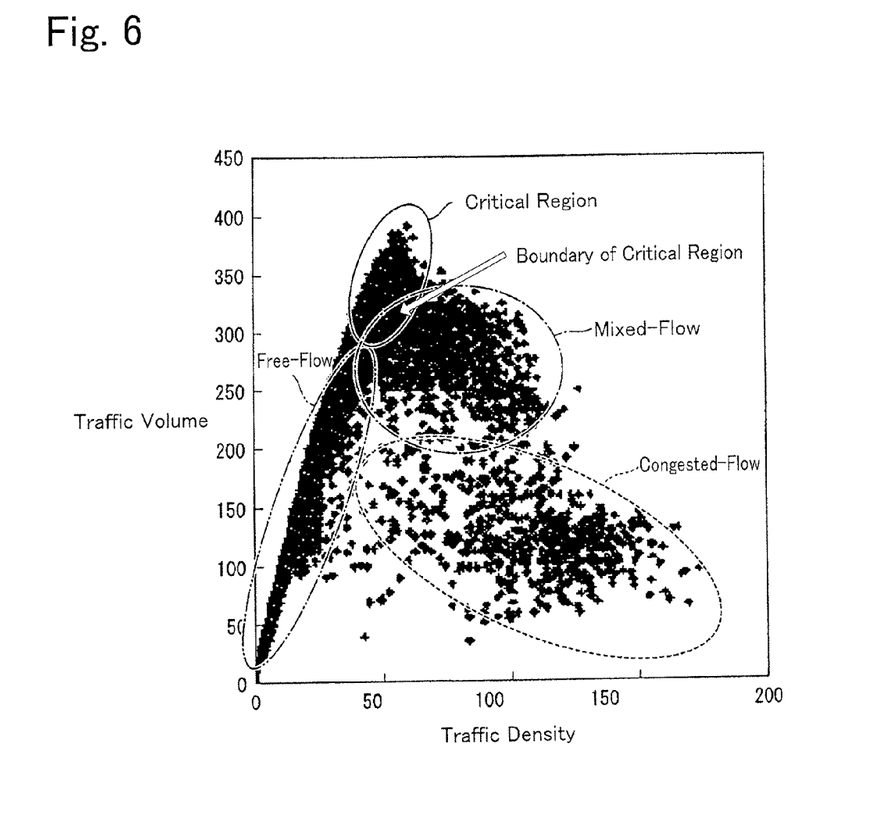
FIG. 6 is a diagram showing a relationship between a traffic density and a traffic volume.

Here, each region illustrated in FIG. 5 will be further described with reference to FIG. 6. FIG. 6 is a diagram showing a relationship between a traffic density and a traffic volume. The horizontal (X) axis in the graph represents the traffic density that indicates the number of vehicles present within a predetermined distance from the ego-vehicle. The reciprocal number of the traffic density corresponds to the inter-vehicle distance. The vertical (Y) axis represents the traffic volume that indicates the number of vehicles passing through a predetermined position. It can be considered that FIG. 6 shows a traffic flow that indicates a flow of vehicles.

The traffic flow illustrated in FIG. 6 can be roughly divided into four states (regions). The first one is a free-flow state where there is a low possibility of occurrence of traffic congestion. In this state, a higher vehicle speed and a longer inter-vehicle distance than certain levels can be realized. The second one is a mixed-flow state where a braking state and an acceleration state of a vehicle are mixed. The mixed-flow state is a state occurring prior to transition to a congested-flow, and is a state in which the degree of freedom of driving by a driver decreases and there is a high probability that the state transits to the congested-flow by a decrease of the traffic flow and an increase of the traffic density (a decrease of inter-vehicle distance). The third one is a congested-flow state that represents traffic congestion. The fourth one is a state of a critical region which is a state occurring in a transition period from the free-flow state to the mixed-flow state. This is a state in which the traffic volume and the traffic density are higher than those in the free-flow, and is a state which transits to the mixed-flow if the traffic volume decreases and the traffic density increases (i.e., the inter-vehicle distance decreases). The critical region may be referred to as a quasi-stable flow or a metastable flow.

From the relationship between FIG. 5 and FIG. 6, the region 59 in FIG. 5 includes the free-flow state and a state of the critical region in FIG. 6 and the region 60 in FIG. 5 includes the mixed-flow state and the congested-flow state in FIG. 6. Therefore, the boundary region in FIG. 5 represents a boundary state including both of the state of the critical region and the mixed-flow state in FIG. 6, so that the boundary region in FIG. 5 is referred to as a boundary of the critical region as shown in FIG. 6. An aim of the present invention is to quantitatively detect the state of the critical region including the boundary of the critical region, and perform drive control such as lane change, to prevent or avoid traffic congestion.

Figure 7:
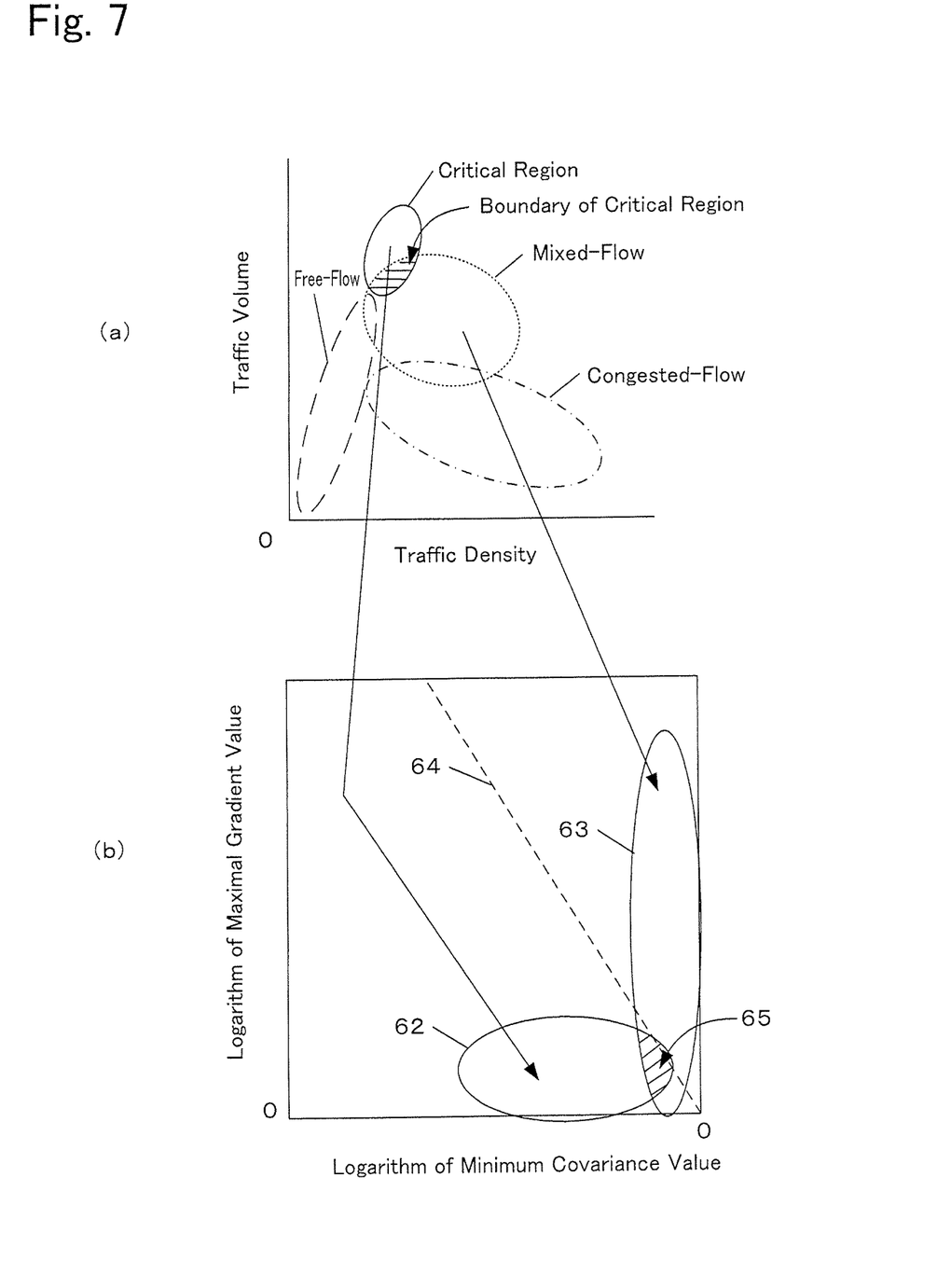
FIG. 7 is a correlation map between the logarithm of the minimum covariance value of an inter-vehicle distance distribution and the logarithm of the maximal gradient value of the acceleration spectrum, according to the embodiment of the present invention.

The quantification of the state of the critical region will be described with reference to FIG. 7. FIG. 7 is a diagram showing a correlation map between the logarithm of the minimum covariance value of the inter-vehicle distance distribution and the logarithm of the maximal gradient value from the acceleration spectrum. FIG. 7 (a) is a diagram schematically depicting the traffic flow map in FIG. 6, and FIG. 7 (b) shows a correlation map between the logarithm of the minimum covariance value and the logarithm of the maximal gradient value. The logarithm of the minimum covariance value and the logarithm of the maximal gradient value in (b) are calculated as logarithmic values of the maximal gradient value calculated by the maximal gradient value calculation unit 33 and the minimum covariance value calculated by the minimum covariance value calculation unit 38.

In FIG. 7 (b), a region denoted by reference numeral 62 includes the critical region in (a), and a region denoted by reference numeral 63 includes the mixed-flow state in (a). A line denoted by reference numeral 64 is a critical line. That is to say, if the state transits to the mixed-flow state through the critical line, the state reaches the traffic congestion. The boundary region 65 between the regions 62 and 63 corresponds to a boundary of the critical region immediately before the critical line 64. The correlation map illustrated in FIG. 7 (b) is stored in a memory (RAM or the like) in the processing unit 14.

The traffic flow determination unit 41 in FIG. 1 determines the type of the traffic flow in the correlation map created by the correlation map creation unit 40. More specifically, the unit 41 determines whether or not the state of the critical region is present as a traffic flow. Then, the traffic flow determination unit 41 transmits a control signal representing the determination result to the drive control unit 42, the notification control unit 43, and the communication control unit 44, in order to prevent the transition to the traffic congestion. Thereby, various controls described below can be performed in order to prevent the transition to the mixed-flow illustrated in FIG. 7. And, as a result, the traffic congestion prediction effective for not only avoidance but also elimination of the traffic congestion, is realized.

The traffic flow determination unit 41 outputs the traffic congestion prediction result or the determination result of the traffic flow to the navigation device 13. The navigation device 13 may perform route search and route guidance of the ego-vehicle in order to avoid traffic congestion, on the basis of the determination result of the traffic flow from the traffic flow determination unit 41 as well as a determination result of the traffic flow or a traffic congestion prediction in other vehicles received through the communication control unit 44.

The drive control unit 42 controls a motion of the ego-vehicle by controlling various actuators, on the basis of the determination result of the traffic flow provided from the traffic flow determination unit 41, information relative to traffic congestion from other vehicles through the communication control unit 44, various signals provided through the switch 15, the detection result of acceleration of the ego-vehicle from the vehicle speed sensor 11, and the detection result of the inter-vehicle distance from the inter-vehicle distance detection unit 36.

Figure 8:
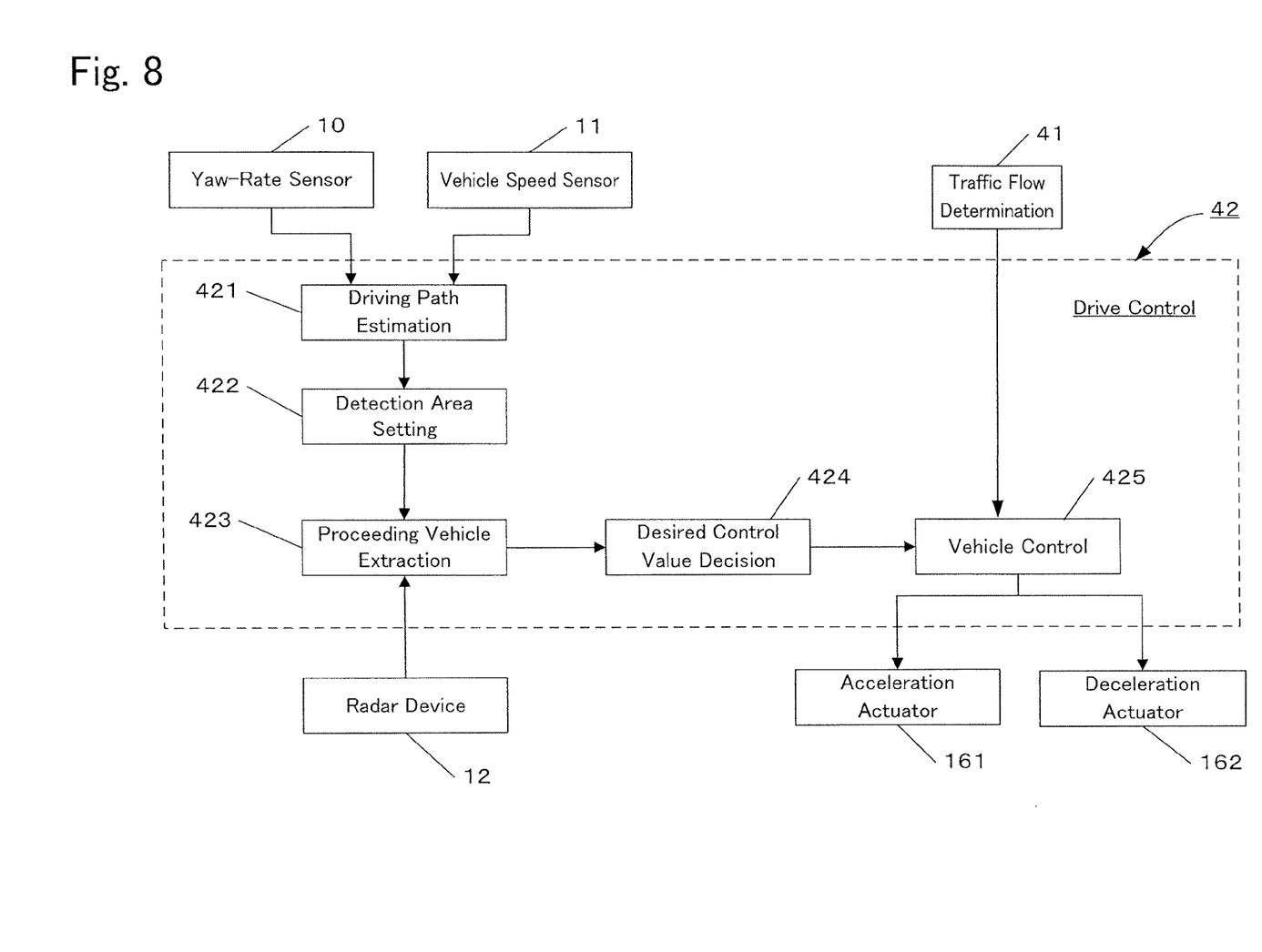
FIG. 8 is a diagram showing a configuration of a drive control unit (function) according to the embodiment of the present invention.

FIG. 8 is a block diagram showing a configuration of the drive control unit 42 according to the embodiment of the present invention. As a basic configuration, the drive control unit 42 is configured to realize an adaptive cruise control (ACC) system in which, when a proceeding vehicle is detected, the ego-vehicle follows the proceeding vehicle while maintaining a target inter-vehicle distance predetermined, and when no proceeding vehicle is detected, the ego-vehicle runs at a constant target speed predetermined.

The drive control unit 42 is also configured to turn on or off the ACC control according to the traffic flow determination result from the traffic flow determination unit 41. For example, when the traffic flow determination result is "there is a critical region", the drive control unit 42 turns off the ACC control to allow a driver to perform a manual operation so that the ego-vehicle can run with a long inter-vehicle distance and a low frequency of braking operation. When the traffic flow determination result is "there is no critical region" or "there is a mixed-flow state", the drive control unit 42 turns on the ACC control so that the ego-vehicle will run with a constant inter-vehicle distance predetermined or a constant speed.

A driving path estimation unit 421 estimates a prospective driving path of the ego-vehicle on the basis of a yaw rate detected by the yaw-rate sensor 10 and acceleration detected by the vehicle speed sensor 11. Specifically, the driving path estimation unit 421 may estimate the prospective driving path of the ego-vehicle by calculating a turning radius from the acceleration and the detected yaw rate and connecting an arc having the calculated turning radius in a current travelling direction of the ego-vehicle.

For estimating the driving path, any method may be used and, additionally or alternatively, information from another sensor may be used. For example, a rudder angle of a steering wheel detected by a rudder angle sensor may be used.

A detection area setting unit 422 uses the estimated driving path as a center line and sets a detection area having a predetermined width along the center line.

A proceeding vehicle extraction unit 423 extracts a proceeding vehicle in the detection area from objects detected by the radar device 12, and determines the extracted vehicle as a target vehicle (hereinafter, referred to as simply "target") which is an object to be followed by the ego-vehicle. Hereinafter, the decision of the target may be referred to as "lock-on" and the release of the decision of the target may be referred to as "lock-off".

When the target is extracted by the proceeding vehicle extraction unit 423, a desired control value decision unit 424 decides a desired control value including a desired vehicle speed and a desired inter-vehicle distance which the ego-vehicle uses while following the target. For deciding the desired values, any appropriate method may be used. For example, the desired inter-vehicle distance is calculated by multiplying the current speed of the ego-vehicle by a desired travelling time to the proceeding vehicle (for example, which can be selected by a driver or a passenger through switches corresponding to intended inter-vehicle distances), and the desired vehicle speed in each control cycle is decided so that the desired inter-vehicle distance can be reached.

On the other hand, when no target is extracted by the proceeding vehicle extraction unit 423, the desired control value decision unit 424 decides a desired control value including a desired vehicle speed for a constant speed driving. The desired control value can be decided by any appropriate method. For example, the desired vehicle speed may be set by a driver or a passenger through a switch dedicated for this purpose.

A vehicle control unit 425 drives an acceleration actuator 161 and a deceleration actuator 162 of the ego-vehicle on the basis of the decided desired control value. For example, the acceleration actuator 161 may be an actuator for changing an opening position of a throttle valve, or an actuator for changing a lifting distance of an air intake valve. As the deceleration actuator 162, a brake device that controls braking action may be used. The vehicle control unit 425 controls the ego-vehicle by driving the actuators, to realize the desired vehicle speed and inter-vehicle distance.

As described above, the vehicle control unit 425 receives the control signal including the traffic flow determination result from the traffic flow determination unit 41, and switches the ACC control to ON or OFF. Specifically, for example, when the traffic flow determination result is "there is no critical region" or "there is a mixed-flow state", the vehicle control unit 425 turns on the ACC control, which causes the ego-vehicle to follow the target extracted by the proceeding vehicle extraction unit 423. When the traffic flow determination result is "there is a critical region", the vehicle control unit 425 turns off the ACC control or releases (locks off) the "lock-on" set by the proceeding vehicle extraction unit 423.

The notification control unit 43 controls notification operation of the display 18 and the loud speaker 17 on the basis of the traffic flow determination result from the traffic flow determination unit 41 and the traffic congestion prediction result or the traffic flow determination result obtained in another vehicle which is provided through the communication control unit 44. For example, the notification control unit 43 provides a control signal for displaying a message such as "decrease the speed and increase the inter-vehicle distance" on the display 18 or for generating an audible sound indicating the same message from the loud speaker 17.

When the drive control unit 42 switches the ACC control to ON or OFF, the notification control unit 43 controls the notification operation of the display 18 and the loud speaker 17 in order to notify the driver of the occurrence of the ACC switching.

Figure 9:
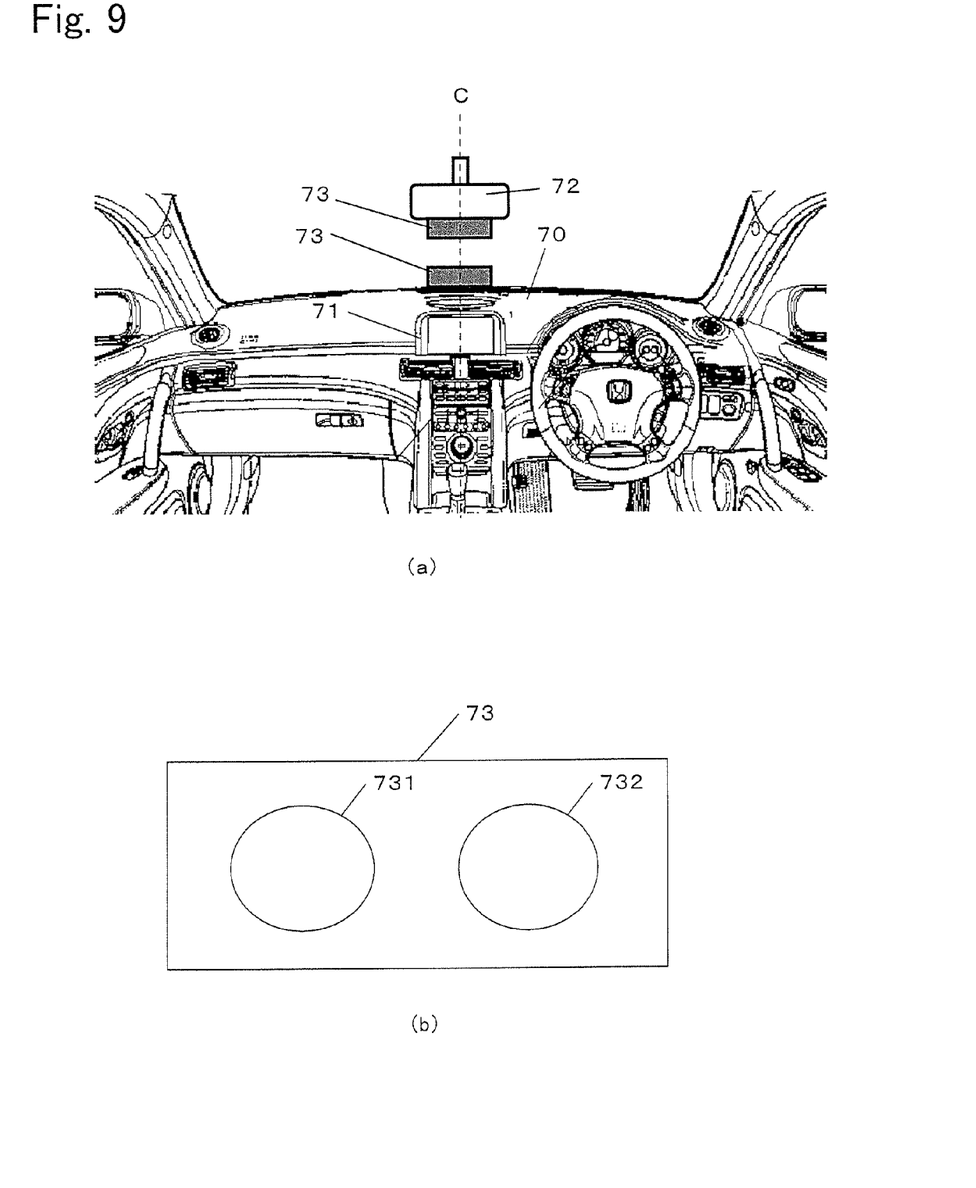
FIG. 9 is a diagram showing an example of a configuration of a display according to the embodiment of the present invention.

FIG. 9 is a diagram showing an example of notification regarding ON/OFF switching of the ACC control by the display according to the embodiment of the present invention. FIG. 9 (*a*) is a diagram showing a position of a display unit 73 in a vehicle interior. FIG. 9 (*a*) illustrates two alternative configurations of the display unit 73, that is, the display unit 73 installed below a rear-view mirror 72 located on the center line C in the ego-vehicle interior and the unit 73 installed on a front cover unit 70. The display unit 73 may be integrated in the navigation device 13 as a part of its display unit 71 or may be disposed over the unit 71. It is desirable that the display unit 73 is positioned near the center of the ego-vehicle interior. This is because, when the display unit 73 is positioned near the center of the ego-vehicle interior, the display unit 73 can be caught in the view of the driver even if the line of sight of the driver is away from the center to left or right.

FIG. 9 (*b*) is an enlarged diagram of the display unit 73. The display unit 73 has two lamps 731 and 732. The lighting state of the lamps 731 and 732 changes according to ON/OFF switching of the ACC control. For example, when the ACC control is ON, the lamp 731 illuminates or blinks in red, and when the ACC control is OFF, the lamp 732 illuminates or blinks in green. The way of lighting (such as color and lighting (blinking) time) may be chosen arbitrarily. At the same time, the ON/OFF state of the ACC control may be notified by voice from the loud speaker 17. Thereby, the ON/OFF state of the ACC control is notified quickly to the driver according to the traffic flow determination result. And this notification can prompt the driver to perform driving operation for avoiding or eliminating traffic congestion.

Figure 10:
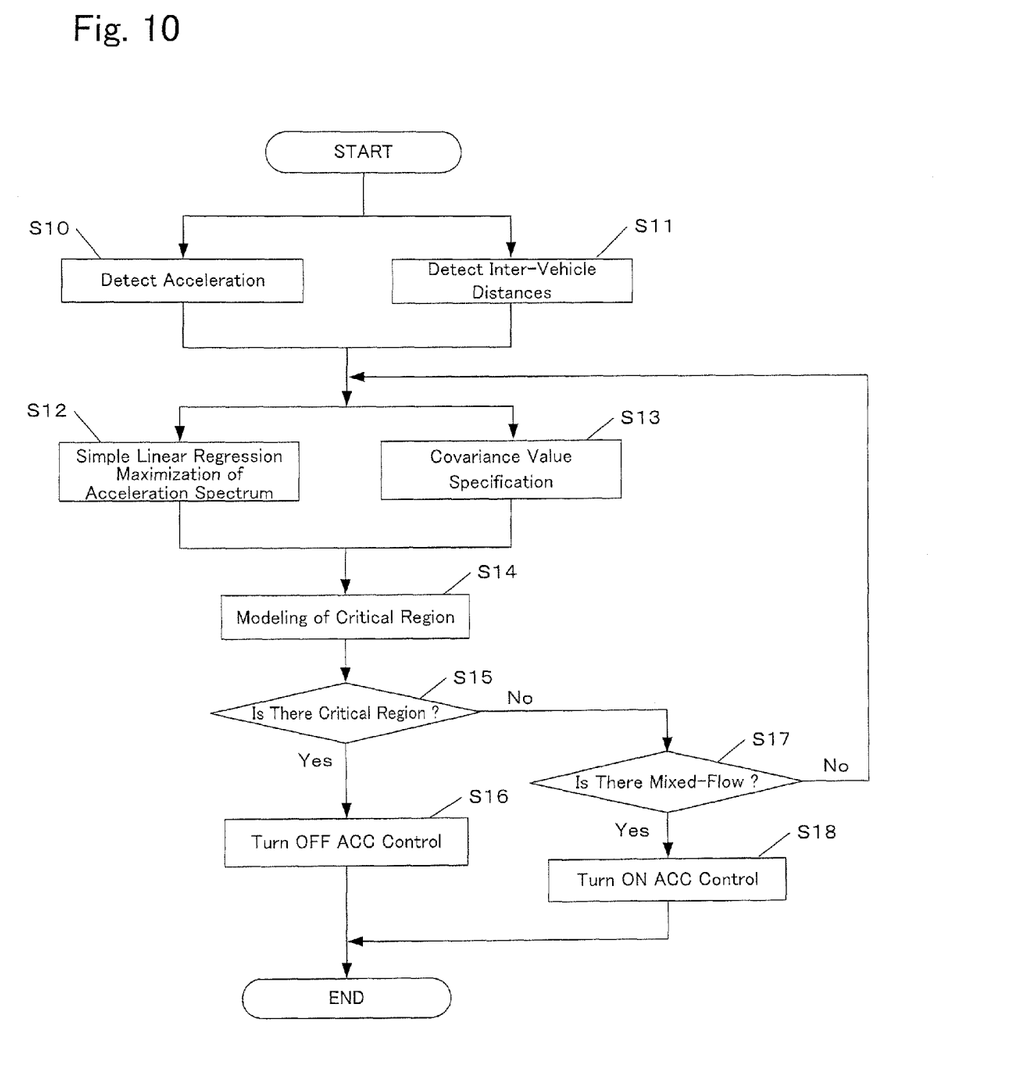
FIG. 10 is a flowchart of a drive control according to the embodiment of the present invention.

FIG. 10 is a flowchart of the traffic congestion prediction according to the embodiment of the present invention. The details of each step are as described above. In step S10, the acceleration of the ego-vehicle is detected by the vehicle speed sensor 11. In parallel with this, in step S11, the inter-vehicle distances between the ego-vehicle and surrounding vehicles are detected on the basis of the output signal from the radar device 12 (blocks 34 to 36 in FIG. 1). In step S12, simple linear regression maximization of the acceleration spectrum is performed. Specifically, the maximal gradient value described above is calculated (blocks 31 to 33 in FIG. 1). In parallel with this, in step S13, covariance value specification is performed. Specifically, the minimum covariance value described above is calculated (blocks 37 and 38 in FIG. 1).

In step S14, modeling of the critical region is performed. Specifically, a correlation map as illustrated in FIG. 7 (*b*) described above is created (block 40 in FIG. 1). In step S15, whether or not a critical region is present is determined. The critical region means the state of the critical region illustrated in FIG. 6 and FIG. 7 (*a*) described above. If the determination is "Yes", the ACC control is switched to OFF in the next step S16. The ACC control is stopped.

When the determination in step S15 is No, whether or not a mixed-flow is present is determined in step S17. If the determination is "Yes", the ACC control is switched to ON in the next step S18. The ACC control described above is performed. If the determination is "No", the process returns to steps S12 and S13 and repeats the subsequent flow.

Whereas a description is made here to the specific embodiments of the present invention, the present invention is not intended to limit to these embodiments. The present invention may be taken into practice by adding modifications to the foregoing embodiment without departing from the scope of the invention.

REFERENCE SIGNS LIST

14 Processing unit
51, 53 Acceleration (power) spectrum
52, 54 Simple linear regression line
100 Driving assist apparatus

The invention claimed is:

1. A driving assist apparatus for a vehicle, comprising:
a sensor which detects acceleration of an ego-vehicle,
a radar which detects other vehicles around the ego-vehicle and provides a detection signal, and
a processing unit having a processor and a memory,
the processing unit being configured to:
perform drive control for the ego-vehicle;
calculate inter-vehicle distances to the other vehicles on the basis of the detection signal provided by the radar;
determine a state of a traffic flow in a lane in which the ego-vehicle is driving, on the basis of the acceleration detected by the sensor and the calculated inter-vehicle distances; and
switch the drive control when the determined state of the traffic flow is a state of a critical region which is present in a transition period from a free-flow state and a mixed flow state, wherein the free-flow state is a state in which the probability of occurrence of traffic congestion is low, and wherein the mixed-flow state is a state in which vehicles in a braking state and vehicles in an acceleration state of a vehicle are mixed,
wherein the processing unit is further configured to:
calculate a logarithm of a maximal gradient value of a simple linear regression line of a power spectrum obtained from an acceleration value of the ego-vehicle;
calculate a distribution of the inter-vehicle distances;
calculate a logarithm of a minimum value of covariance of the distribution; and
generate a correlation map between the logarithm of the maximal gradient value and the logarithm of the minimum value of covariance, and
wherein the processing unit determines the state of the traffic flow on the basis of the correlation map.

2. The driving assist apparatus according to claim 1, wherein the processing unit is further configured to notify the switching of the drive control through a display or a loud speaker mounted on the ego-vehicle.

3. The driving assist apparatus according to claim 1, wherein the processing unit is further configured to:
perform an adaptive cruise control as a part of the drive control, and
turn on or off the adaptive cruise control at the switching of the drive control.

4. A method of assisting driving of a vehicle, comprising:
detecting acceleration of an ego-vehicle with a sensor;
detecting other vehicles around the ego-vehicle with a radar and obtaining a detection signal from the radar;
performing drive control for the ego-vehicle;
calculating inter-vehicle distances to the other vehicles on the basis of the detection signal obtained from the radar;
determining a state of a traffic flow in a lane in which the ego-vehicle is driving, on the basis of the acceleration detected with the sensor and the calculated inter-vehicle distances; and
switching the drive control when the determined state of the traffic flow is a state of a critical region which is present in a transition period from a free-flow state and a mixed flow state, wherein the free-flow state is a state in which the probability of occurrence of traffic congestion is low, and wherein the mixed-flow state is a state in which a braking state and an acceleration state of a vehicle are mixed,
wherein said determining the state of the traffic flow comprises:
calculating a logarithm of a maximal gradient value of a simple linear regression line of a power spectrum obtained from the acceleration value of the ego-vehicle;
calculating a distribution of the inter-vehicle distances;
calculating a logarithm of a minimum value of covariance of the distribution;
generating a correlation map between the logarithm of the maximal gradient value and the logarithm of the minimum value of covariance; and
determining the state of the traffic flow on the basis of the correlation map.

5. The method according to claim 4, further comprising:
notifying the switching of the drive control through a display or a loud speaker mounted on the ego-vehicle.

6. The method according to claim 4, further comprising:
performing an adaptive cruise control as a part of the drive control, and
turning on or off the adaptive cruise control at the switching of the drive control.

7. A driving assist apparatus for a vehicle, comprising:
a sensor which detects acceleration of an ego-vehicle,
a radar which detects other vehicles around the ego-vehicle and provides a detection signal, and
a processing unit having a processor and a memory,
the processing unit comprises:
means for performing drive control for the ego-vehicle;
means for calculating inter-vehicle distances to the other vehicles on the basis of the detection signal provided by the radar;
means for determining a state of a traffic flow in a lane in which the ego-vehicle is driving, on the basis of the acceleration detected by the sensor and the calculated inter-vehicle distances; and
means for switching the drive control when the determined state of the traffic flow is a state of a critical region which is present in a transition period from a free-flow state and a mixed flow state, wherein the free-flow state is a state in which the probability of occurrence of traffic congestion is low, and wherein the mixed-flow state is a state in which vehicles in a braking state and vehicles in an acceleration state of a vehicle are mixed,
wherein the processing unit further comprises:
means for calculating a logarithm of a maximal gradient value of a simple linear regression line of a power spectrum obtained from an acceleration value of the ego-vehicle;
means for calculating a distribution of the inter-vehicle distances;
means for calculating a logarithm of a minimum value of covariance of the distribution; and
means for generating a correlation map between the logarithm of the maximal gradient value and the logarithm of the minimum value of covariance, and
wherein the means for determining determines the state of the traffic flow on the basis of the correlation map.

8. The driving assist apparatus according to claim 7,
wherein the processing unit further comprises means for notifying the switching of the drive control through a display or a loud speaker mounted on the ego-vehicle.

9. The driving assist apparatus according to claim 7,
wherein the processing unit further comprises means for performing an adaptive cruise control as a part of the drive control, and
wherein the means for switching turns on or off the adaptive cruise control at the switching of the drive control.

* * * * *